(12) United States Patent
Togashi

(10) Patent No.: US 7,619,873 B2
(45) Date of Patent: Nov. 17, 2009

(54) FEEDTHROUGH MULTILAYER CAPACITOR

(75) Inventor: Masaaki Togashi, Tokyo (JP)

(73) Assignee: TDK Corporation, Tokyo (JP)

( * ) Notice: Subject to any disclaimer, the term of this patent is extended or adjusted under 35 U.S.C. 154(b) by 205 days.

(21) Appl. No.: 11/819,431

(22) Filed: Jun. 27, 2007

(65) Prior Publication Data

US 2008/0013248 A1   Jan. 17, 2008

(30) Foreign Application Priority Data

Jul. 13, 2006   (JP) .............................. 2006-193003

(51) Int. Cl.
*H01G 4/228* (2006.01)
*H01G 4/005* (2006.01)
(52) U.S. Cl. .................................... 361/306.3; 361/303
(58) Field of Classification Search ......... 361/303–305, 361/309, 301.2, 302, 306.2, 306.3
See application file for complete search history.

(56) References Cited

U.S. PATENT DOCUMENTS 4,590,537 A * 5/1986 Sakamoto ................. 361/306.3

2005/0041368 A1 * 2/2005 Togashi ..................... 361/306.3

FOREIGN PATENT DOCUMENTS

| JP | A 1-206615 | 8/1989 |
| JP | A-2005032900 | 2/2005 |
| JP | A-2005-347778 | 12/2005 |

* cited by examiner

*Primary Examiner*—Eric Thomas
(74) *Attorney, Agent, or Firm*—Oliff & Berridge, PLC

(57) ABSTRACT

A feedthrough multilayer capacitor has a capacitor body, at least two signal terminal electrodes, at least one grounding terminal electrode, and at least one connecting conductor. The capacitor body includes a plurality of insulator layers laminated, a signal inner electrode and a first grounding inner electrode which are arranged so as to oppose each other with at least one insulator layer in between, and a second grounding inner electrode arranged so as to oppose the signal inner electrode or first grounding inner electrode with at least one insulator layer in between. The signal inner electrode is connected to the signal terminal electrodes. The first grounding inner electrode is connected to the connecting conductor. The second grounding inner electrode is connected to the grounding terminal electrode and connecting conductor.

3 Claims, 7 Drawing Sheets

FEEDTHROUGH MULTILAYER CAPACITOR

BACKGROUND OF THE INVENTION

1. Field of the Invention

The present invention relates to a feedthrough multilayer capacitor.

2. Related Background Art

Known as this kind of feedthrough multilayer capacitor is one comprising a capacitor body in which insulator layers and inner electrodes for signals and grounding are alternately laminated, and terminal electrodes for signals and grounding formed on the capacitor body (see, for example, Japanese Patent Application Laid-Open No. HEI 01-206615).

On the other hand, power supplies for central processing units (CPUs) mounted in digital electronic devices have been lowering their voltage while increasing their load current. This has made it very difficult for fluctuations in power voltage to be held under a tolerable level, whereby a multilayer capacitor known as decoupling capacitor has been connected to the power supplies. When the load current fluctuates transiently, the multilayer capacitor supplies a current to the CPU, thereby suppressing the fluctuation in power voltage.

Recently, as the CPUs have further been increasing their frequency, their load current has been becoming faster and greater. Therefore, the multilayer capacitors employed in decoupling capacitors have been demanded to increase their capacity and equivalent series resistance (ESR).

SUMMARY OF THE INVENTION

However, no consideration has been made for increasing the equivalent series resistance in the feedthrough multilayer capacitor described in Japanese Patent Application Laid-Open No. HEI 01-206615. Further, all the inner electrodes are directly connected to terminal electrodes in the feedthrough multilayer capacitor described in Japanese Patent Application Laid-Open No. HEI 01-206615. Therefore, the equivalent series resistance becomes smaller when the number of laminated layers is increased so as to enhance the capacitance in this feedthrough multilayer capacitor.

For overcoming the problem mentioned above, it is an object of the present invention to provide a feedthrough multilayer capacitor which can increase the equivalent series resistance.

Meanwhile, in a typical feedthrough multilayer capacitor, all the inner electrodes are connected to their corresponding terminal electrodes through lead portions. Therefore, the lead portions connected to the terminal electrodes exist by the number of inner electrodes, thereby reducing the equivalent series resistance. When the number of laminated insulator layers and inner electrode layers is made greater in order to increase the capacity of the feedthrough multilayer capacitor, the number of lead portions also increases. Since the resistance components of the lead portions connected to terminal electrodes are connected in parallel to the terminal electrodes, the equivalent series resistance of the feedthrough multilayer capacitor further decreases as the number of lead portions connected to the terminal electrodes increases. Thus, demands for greater capacity and greater equivalent series resistance in a feedthrough multilayer capacitor are contradictory to each other.

Therefore, the inventors conducted diligent studies concerning a feedthrough multilayer capacitor which can satisfy demands for increasing the capacity and equivalent series resistance. As a result, the inventors have found a new fact that the equivalent series resistance can be adjusted to a desirable value if inner electrodes are connected with connecting conductors formed on a surface of a capacitor body while the number of lead portions can be changed, even when the number of laminated insulator layers and inner electrodes is held constant. The inventors have also found a new fact that the equivalent series resistance can be adjusted to a desirable value if inner electrodes are connected with connecting conductors formed on a surface of a capacitor body while positions of lead portions in the laminating direction of the capacitor body can be changed. In particular, the equivalent series resistance can be adjusted such as to become greater if the number of lead portions is made smaller than that of inner electrodes.

In view of such results of studies, an embodiment of the present invention provides a feedthrough multilayer capacitor comprising a capacitor body, at least two signal terminal electrodes arranged on an outer surface of the capacitor body, at least one grounding terminal electrode arranged on the outer surface of the capacitor body, and at least one connecting conductor arranged on the outer surface of the capacitor body; wherein the capacitor body includes a plurality of insulator layers laminated, a signal inner electrode and a first grounding inner electrode arranged so as to oppose each other with at least one of the plurality of insulator layers in between, and a second grounding inner electrode arranged so as to oppose the signal inner electrode or first grounding inner electrode with at least one of the plurality of insulator layers in between; wherein the signal inner electrode is connected to at least two signal terminal electrodes; wherein the first grounding inner electrode is connected to at least one connecting conductor; and wherein the second grounding inner electrode is connected to at least one grounding terminal electrode and at least one connecting conductor.

In the above-mentioned feedthrough multilayer capacitor, the grounding inner electrodes include a first grounding inner electrode connected to a grounding terminal electrode, and a second grounding inner electrode not directly connected to the grounding terminal electrode. Therefore, this feedthrough multilayer capacitor can make the equivalent series resistance greater than that in the case where all the grounding inner electrodes are connected to the grounding terminal electrodes.

Preferably, in this case, the capacitor body is formed like a rectangular parallelepiped and has oblong first and second main faces opposing each other, first and second side faces extending in a shorter side direction of the first and second main faces so as to connect the first and second main faces to each other and opposing each other, and third and fourth side faces extending in a longer side direction of the first and second main faces so as to connect the first and second main faces to each other and opposing each other; at least two signal terminal electrodes are arranged on the first and second side faces, respectively; at least one grounding terminal electrode is arranged on the third or fourth side face; at least one connecting conductor is arranged on the third or fourth side face; the signal inner electrode includes a main electrode portion whose longer side direction is the longer side direction of the first and second main faces, and lead portions respectively extending from the main electrode portion to the first and second side faces and connecting with the signal terminal electrodes; the first grounding inner electrode includes a main electrode portion whose longer side direction is the longer side direction of the first and second main faces, and a lead portion extending from the main electrode portion to the third or fourth side face and connecting with the connecting conductor; and the second grounding inner electrode includes a main electrode portion whose longer side direction is the longer side direction of the first and second main faces, a lead portion extending from the main electrode portion to the third or fourth side face and connecting with the connecting conductor, and a lead portion extending from the main electrode portion to the third or fourth side face and connecting with the grounding terminal electrode.

The present invention can provide a feedthrough multilayer capacitor which can increase the equivalent series resistance.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

In the following, preferred embodiments will be explained in detail with reference to the accompanying drawings. In the explanation, the same constituents or those having the same functions will be referred to with the same numerals while omitting their overlapping explanations.

First Embodiment

Figure 1:
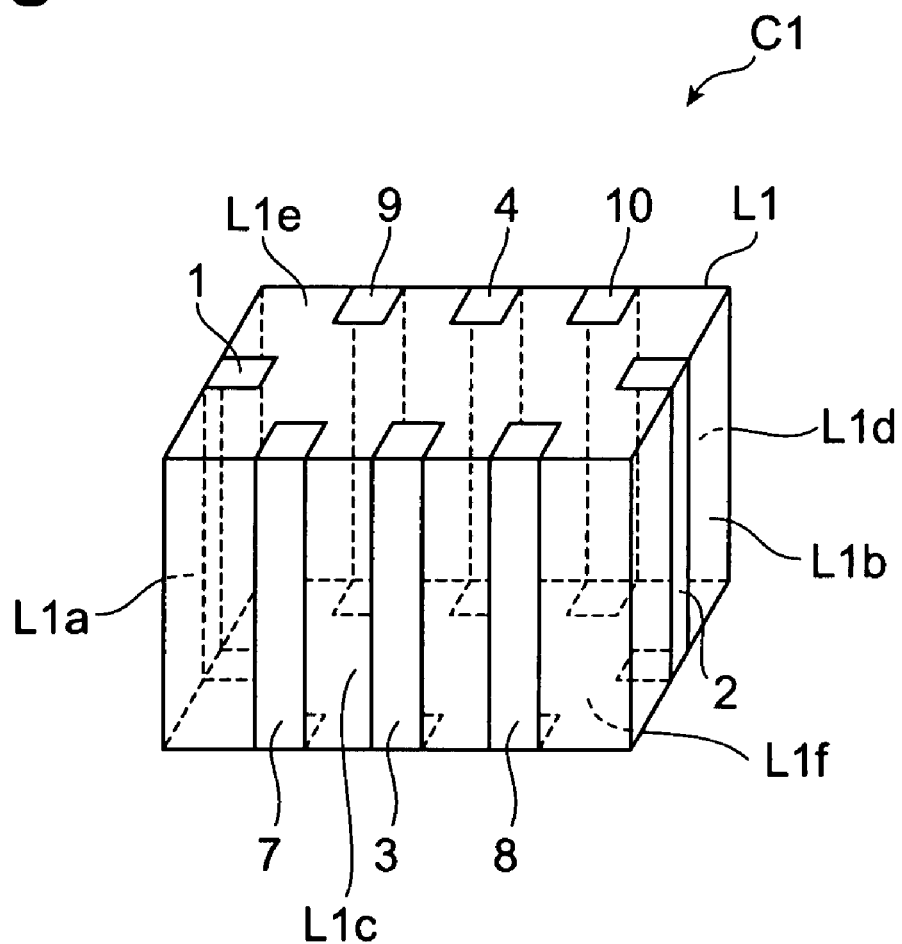
FIG. 1 is a perspective view of the feedthrough multilayer capacitor in accordance with a first embodiment.
Figure 2:
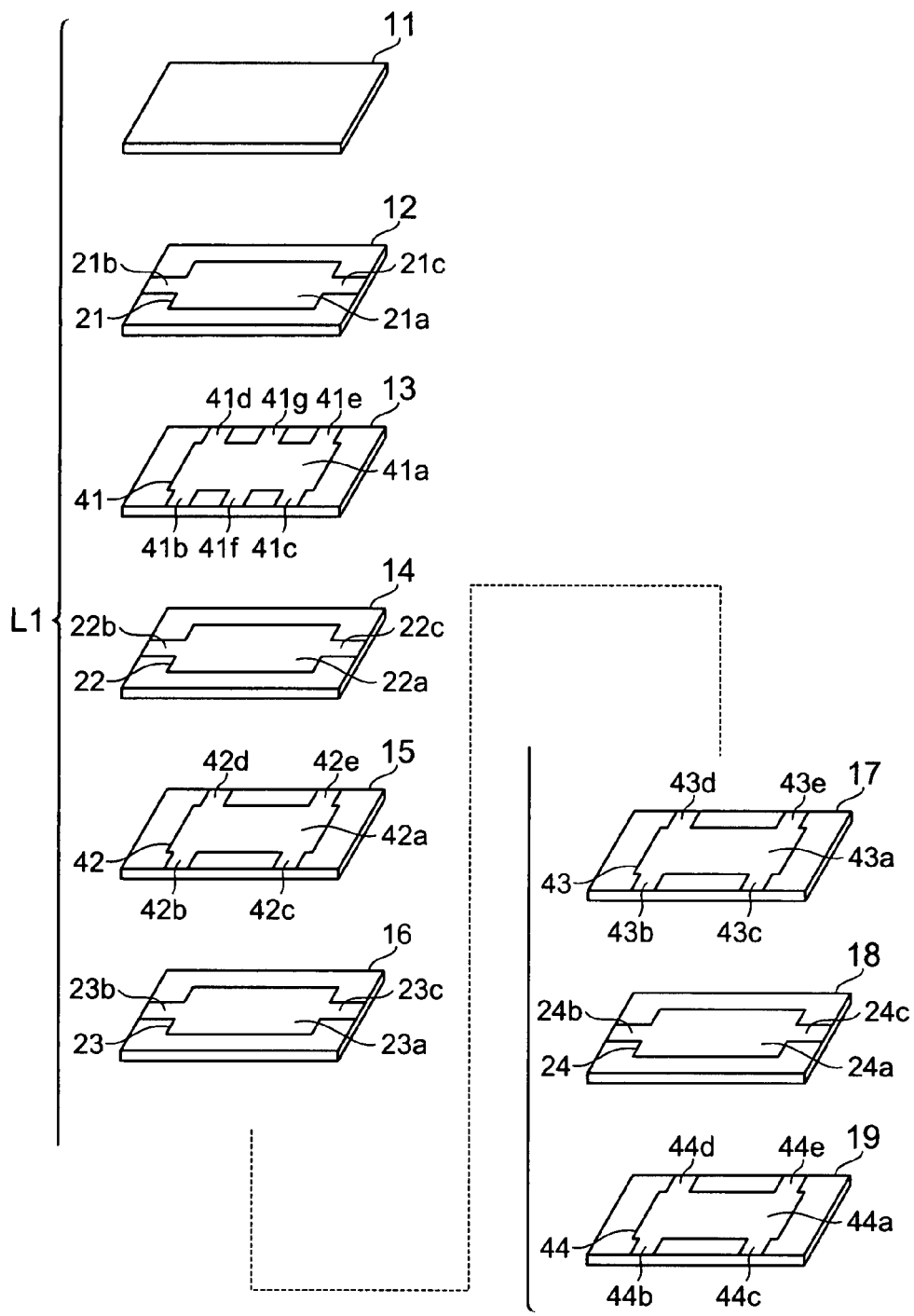
FIG. 2 is an exploded perspective view of the capacitor body included in the feedthrough multilayer capacitor in accordance with the first embodiment.

With reference to FIGS. 1 and 2, the structure of feedthrough multilayer capacitor C1 in accordance with a first embodiment will be explained. FIG. 1 is a perspective view of the feedthrough multilayer capacitor in accordance with the first embodiment. FIG. 2 is an exploded perspective view of the capacitor body included in the feedthrough multilayer capacitor in accordance with the first embodiment.

As shown in FIG. 1, the feedthrough multilayer capacitor C1 in accordance with the first embodiment comprises a capacitor body L1, signal terminal electrodes 1, 2 arranged on the outer surface of the capacitor body L1, grounding terminal electrodes 3, 4 arranged on the outer surface of the capacitor body L1, and connecting conductors 7 to 10 arranged on the outer surface of the capacitor body L1. The signal terminal electrodes 1, 2, grounding terminal electrodes 3, 4, and connecting conductors 7 to 10 are formed, for example, by applying and baking a conductive paste, which contains a conductive metal powder and a glass frit, onto the outer surface of the capacitor body. A plating layer may be formed on the baked terminal electrodes and connecting conductors when necessary. The signal terminal electrodes 1, 2, grounding terminal electrodes 3, 4, and connecting conductors 7 to 10 are formed such as to be electrically insulated from each other on the surface of the capacitor body L1.

As shown in FIG. 1, the capacitor body L1 is shaped like a rectangular parallelepiped and has oblong first and second main faces L1$e$, L1$f$ opposing each other, first and second side faces L1$a$, L1$b$ extending in the shorter side direction of the first and second main faces L1$e$, L1$f$ so as to connect the first and second main faces L1$e$, L1$f$ to each other and opposing each other, and third and fourth side faces L1$c$, L1$d$ extending in the longer side direction of the first and second main faces L1$e$, L1$f$ so as to connect the first and second main faces L1$e$, L1$f$ to each other and opposing each other.

The signal terminal electrode 1 is arranged on the first side face L1$a$ of the capacitor body L1. The signal terminal electrode 2 is arranged on the second side face L1$b$ opposing the first side face L1$a$ of the capacitor body L1. The signal terminal electrode 1 arranged on the first side face L1$a$ and the signal terminal electrode 2 arranged on the second side face L1$b$ oppose each other in the direction in which the first side face L1$a$ and second side face L1$b$ oppose each other.

The grounding terminal electrode 3 is arranged on the third side face L1$c$ of the capacitor body L1. The grounding terminal electrode 4 is arranged on the fourth side face L1$d$ of the capacitor body L1. The connecting conductors 7, 8 are arranged on the third side face L1$c$ of the capacitor body L1. The connecting conductors 9, 10 are arranged on the fourth side face L1$d$ of the capacitor body L1.

The grounding terminal electrode 3 and connecting conductors 7, 8 are arranged on the third side face L1$c$ of the capacitor body L1 in the order of the connecting conductor 7, grounding terminal electrode 3, and connecting conductor 8 in the direction from the first side face L1$a$ to the second side face L1$b$. The grounding terminal electrode 4 and connecting conductors 9, 10 are arranged on the fourth side face L1$d$ of the capacitor body L1 in the order of the connecting conductor 9, grounding terminal electrode 4, and connecting conductor 10 in the direction from the first side face L1$a$ to the second side face L1$b$.

The grounding terminal electrode 3 arranged on the third side face L1$c$ and the grounding terminal electrode 4 arranged on the fourth side face L1$d$ oppose each other in the direction in which the third side face L1$c$ and fourth side face L1$d$ oppose each other. The connecting conductor 7 arranged on the third side face L1$c$ and the connecting conductor 9 arranged on the fourth side face L1$d$ oppose each other in the direction in which the third side face L1$c$ and fourth side face L1$d$ oppose each other. The connecting conductor 8 arranged on the third side face L1$c$ and the connecting conductor 10 arranged on the fourth side face L1$d$ oppose each other in the direction in which the third side face L1$c$ and fourth side face L1$d$ oppose each other.

As shown in FIG. 2, the capacitor body L1 has a plurality of (9 in this embodiment) insulator layers 11 to 19 and a plurality of (8 in this embodiment) inner electrodes 21 to 24, 41 to 44. Each of the insulator layers 11 to 19 is constituted by a sintered body of a ceramic green sheet including a dielectric ceramic, for example. In the actual feedthrough multilayer capacitor C1, the dielectric layers 11 to 19 are integrated to such an extent that their boundaries are indiscernible.

The plurality of inner electrodes 21 to 24, 41 to 44 include a plurality of (4 in this embodiment) signal inner electrodes 21 to 24 and a plurality of (4 in this embodiment) grounding inner electrodes 41 to 44. The grounding inner electrodes 41 to 44 include the first grounding inner electrodes 42 to 44 and the second grounding inner electrode 41. Each of the inner electrodes 21 to 24, 41 to 44 is constituted by a sintered body of a conductive paste, for example.

The signal inner electrodes 22 to 24 and first grounding inner electrodes 42 to 44 are arranged so as to oppose each other with one of the insulator layers 14 to 18 in between each pair. Namely, the signal inner electrode 22 and first grounding inner electrode 42 oppose each other with the insulator layer 14 in between. The signal inner electrode 23 and first grounding inner electrode 42 oppose each other with the insulator layer 15 in between. The signal inner electrode 23 and first grounding inner electrode 43 oppose each other with the insulator layer 16 in between. The signal inner electrode 24 and first grounding inner electrode 43 oppose each other with the insulator layer 17 in between. The signal inner electrode 24 and first grounding inner electrode 44 oppose each other with the insulator layer 18 in between.

The second grounding inner electrode 41 is arranged such as to oppose the signal inner electrode 21 with one insulator layer 12 in between, and oppose the signal inner electrode 22 with one insulator layer 13 in between.

The signal inner electrodes 21 to 24 have rectangular main electrode portions 21a to 24a whose longer side direction is the longer side direction of the first and second main faces L1e, L1f of the capacitor body L1, lead portions 21b to 24b extending from the main electrode portions 21a to 24a to the first side face L1a, and lead portions 21c to 24c extending from the main electrode portions 21a to 24a to the second side face L1b.

The lead portions 21b to 24b extending so as to reach the first side face L1a of the capacitor body L1 are connected to the signal terminal electrode 1. The lead portions 21c to 24c extending so as to reach the second side face L1b of the capacitor body L1 are connected to the signal terminal electrode 2.

The first grounding inner electrodes 42 to 44 have rectangular main electrode portions 42a to 44a whose longer side direction is the longer side direction of the first and second main faces L1e, L1f of the capacitor body L1, lead portions 42b to 44b, 42c to 44c extending from the main electrode portions 42a to 44a to the third side face L1c, and lead portions 42d to 44d, 42e to 44e extending from the main electrode portions 42a to 44a to the fourth side face L1d.

The lead portions 42b to 44b, 42c to 44c extending from the main electrode portions 42a to 44a to the third side face L1c are positioned in the order of the lead portions 42b to 44b, 42c to 44c in the direction from the first side face L1a to the second side face L1b. The lead portions 42d to 44d, 42e to 44e extending from the main electrode portions 42a to 44a to the fourth side face L1d are positioned in the order of the lead portions 42d to 44d, 42e to 44e in the direction from the first side face L1a to the second side face L1b.

The lead portions 42b to 44b extending so as to reach the third side face L1c of the capacitor body L1 are connected to the connecting conductor 7. The lead portions 42c to 44c extending so as to reach the third side face L1c of the capacitor body L1 are connected to the connecting conductor 8. The lead portions 42d to 44d extending so as to reach the fourth side face L1d of the capacitor body L1 are connected to the connecting conductor 9. The lead portions 42e to 44e extending so as to reach the fourth side face L1d of the capacitor body L1 are connected to the connecting conductor 10.

The second grounding inner electrode 41 includes a rectangular main electrode portion 41a whose longer side direction is the longer side direction of the first and second main faces L1e, L1f of the capacitor body L1, lead portions 41b, 41c, 41f extending from the main electrode portion 41a to the third side face L1c, and lead portions 41d, 41e, 41g extending from the main electrode portion 41a to the fourth side face L1d.

The lead portions 41b, 41c, 41f extending from the main electrode portion 41a to the third side face L1c are positioned in the order of the lead portions 41b, 41f, 41c in the direction from the first side face L1a to the second side face L1b. The lead portions 41d, 41e, 41g extending from the main electrode portion 41a to the fourth side face L1d are positioned in the order of the lead portions 41d, 41g, 41e in the direction from the first side face L1a to the second side face L1b.

The lead portion 41b extending so as to reach the third side face L1c of the capacitor body L1 is connected to the connecting conductor 7. The lead portion 41c extending so as to reach the third side face L1c of the capacitor body L1 is connected to the connecting conductor 8. The lead portion 41f extending so as to reach the third side face L1c of the capacitor body L1 is connected to the grounding terminal electrode 3. The lead portion 41d extending so as to reach the fourth side face L1d of the capacitor body L1 is connected to the connecting conductor 9. The lead portion 41e extending so as to reach the fourth side face L1d of the capacitor body L1 is connected to the connecting conductor 10. The lead portion 41g extending so as to reach the fourth side face L1d of the capacitor body L1 is connected to the grounding terminal electrode 4.

Figure 3:
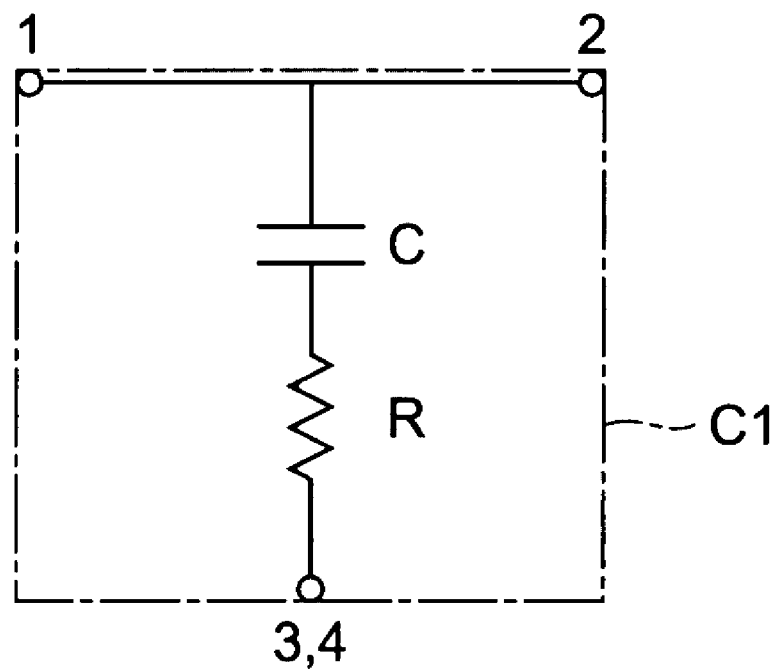
FIG. 3 is an equivalent circuit diagram of the feedthrough multilayer capacitor in accordance with the first embodiment.

FIG. 3 shows an equivalent circuit diagram of the feedthrough multilayer capacitor C1. The equivalent circuit diagram of FIG. 3 represents a case where the signal terminal electrodes 1, 2 are connected to a signal lead, the grounding terminal electrodes 3, 4 are connected to the ground, and the conductors 7 to 10 are not directly connected to any lead.

In the feedthrough multilayer capacitor C1, not all but only a part (second grounding inner electrode 41) of the grounding inner electrodes 41 to 44 is directly connected to the grounding terminal electrodes 3, 4, while the rest (first grounding inner electrodes 42 to 44) are connected to the grounding terminal electrodes 3, 4 through the second grounding inner electrode 41 and connecting conductors 7 to 10. Therefore, the resistance R obtained by connecting the grounding inner electrodes 41 to 44 through the connecting conductors 7 to 10 is connected in series to the capacitance C inherent in the feedthrough multilayer capacitor C1 on the side of the grounding terminal electrodes 3, 4.

As the grounding inner electrodes, the feedthrough multilayer capacitor C1 has the first grounding inner electrodes 42 to 44 not connected to the grounding terminal electrodes 3, 4, and the second grounding inner electrode 41 connected to the grounding terminal electrodes. When the grounding terminal electrode 3 is concerned, the respective resistance components of the connecting conductors 7 to 10 are connected in series to the grounding terminal electrode 3. When the grounding terminal electrode 4 is concerned, the respective resistance components of the connecting conductors 7 to 10 are connected in series to the grounding terminal electrode 4. These make the feedthrough multilayer capacitor C1 have an equivalent series resistance greater than that of the conventional feedthrough multilayer capacitor in which all the grounding inner electrodes 41 to 44 are connected to the grounding terminal electrodes 3, 4 through lead portions.

Also, a greater equivalent series resistance prevents impedance from dropping drastically at a resonance frequency, thus making it possible to increase the bandwidth.

As in the foregoing, this embodiment sets the equivalent series resistance of the feedthrough multilayer capacitor C1 to a desirable value by adjusting one or both of the number and position of the second grounding inner electrode 41 connected to the grounding terminal electrodes 3, 4 through the lead portions 41f, 41g, whereby the equivalent series resistance can be regulated easily and accurately.

The feedthrough multilayer capacitor C1 also restrains the equivalent series resistance from becoming small, even when the capacitance is enhanced by increasing the number of laminated signal inner electrodes and first grounding inner electrodes so as to respond to greater capacity.

When the feedthrough multilayer capacitor C1 is connected to a circuit board or the like such as to yield the equivalent circuit shown in FIG. 3, the capacitance C and the resistance R obtained by connecting the grounding inner electrodes 41 to 44 through the connecting conductors 7 to 10 are connected in series. Therefore, this feedthrough multilayer capacitor C1 is favorable as a capacitor for a power supply.

In the feedthrough multilayer capacitor C1, the signal terminal electrodes 1, 2 oppose each other in the direction in which the first and second side faces L1a, L1b of the capacitor body L1 oppose each other. The pairs of grounding terminal electrodes 3, 4, connecting conductors 7, 9, and connecting conductors 8, 10 oppose each other in the direction in which the first and second side faces L1a, L1b of the capacitor body L1 oppose each other. These make it easy to connect the signal terminal electrodes 1, 2 to a linear signal lead, and the grounding terminal electrodes 3, 4 to a linear ground connecting lead, for example, in the feedthrough multilayer capacitor C1, whereby its mounting is easy.

Figure 4:
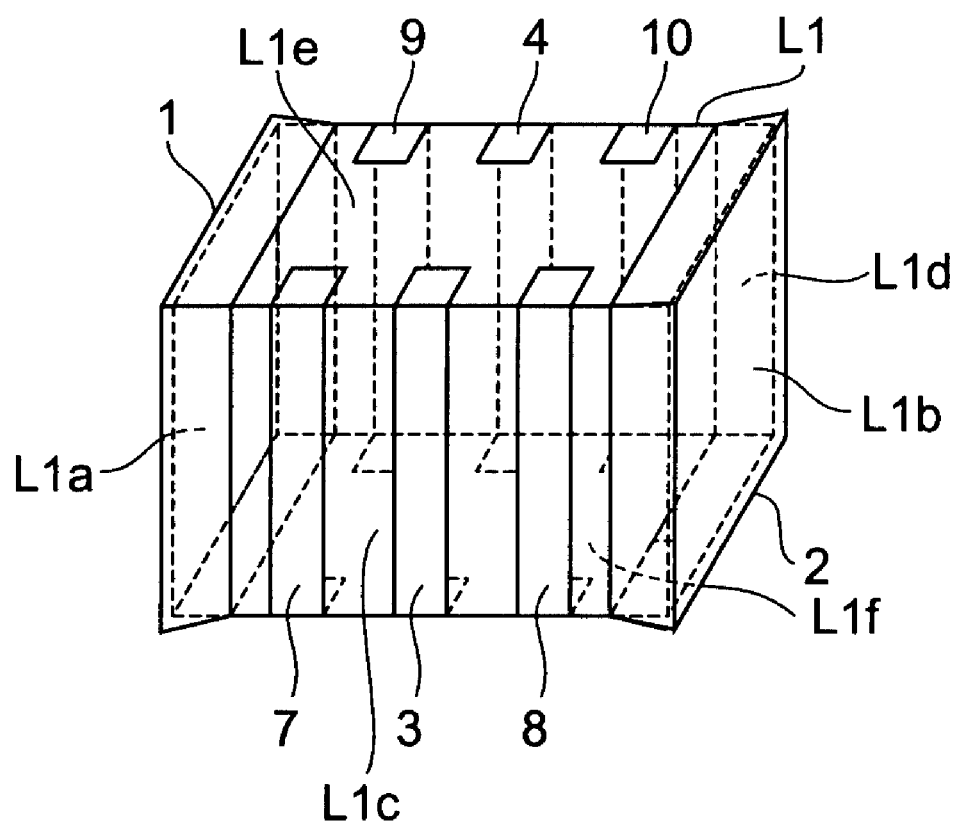
FIG. 4 is a perspective view of a modified example of the feedthrough multilayer capacitor in accordance with the first embodiment.
Figure 5:
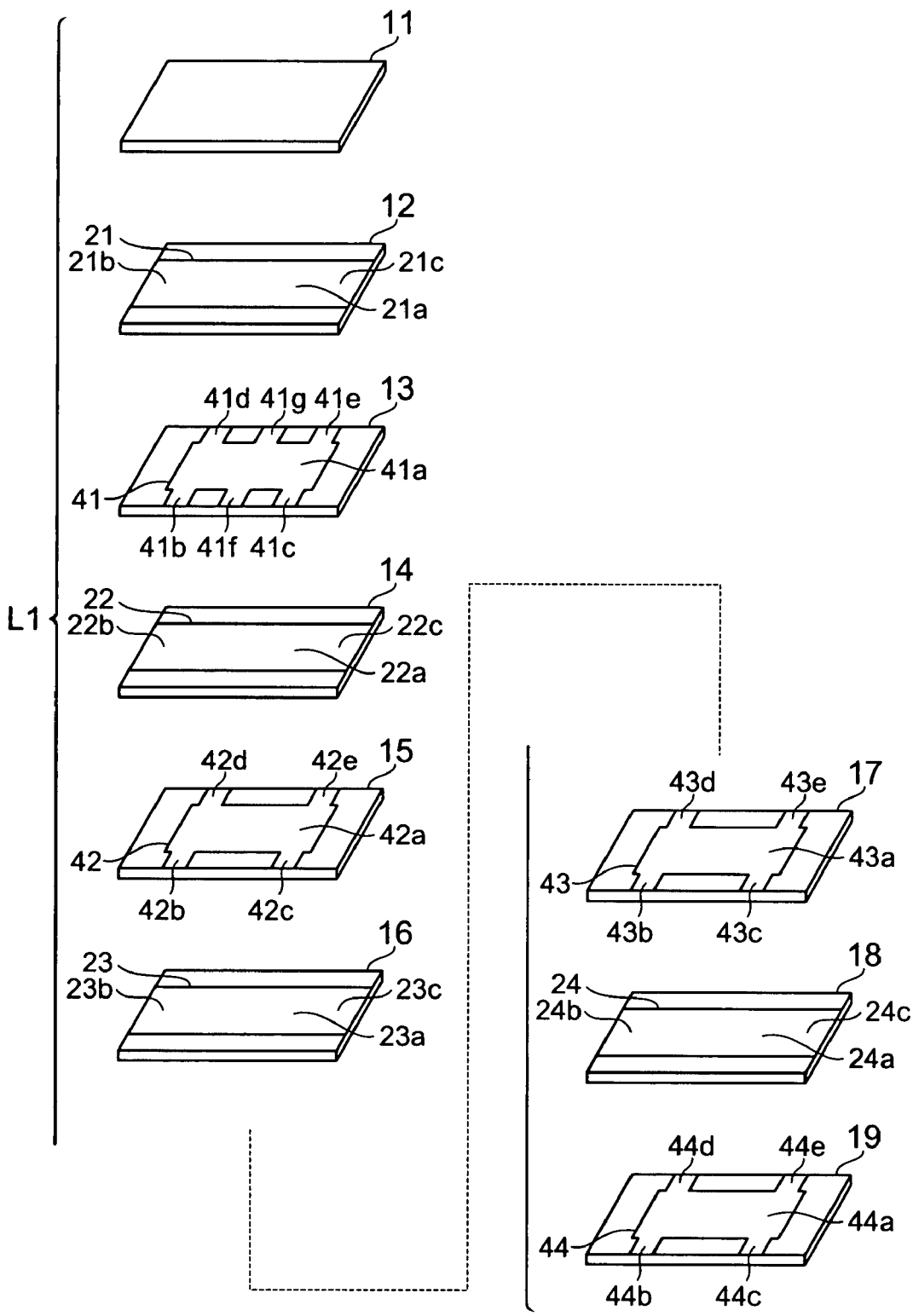
FIG. 5 is an exploded perspective view of the capacitor body included in the modified example of the feedthrough multilayer capacitor in accordance with the first embodiment.

With reference to FIGS. 4 and 5, a modified example of the feedthrough multilayer capacitor C1 in accordance with the first embodiment will now be explained. This modified example differs from the feedthrough multilayer capacitor C1 in accordance with the embodiment in terms of the forms of signal terminal electrodes 1, 2. FIG. 4 is a perspective view of the feedthrough multilayer capacitor in accordance with the modified example. FIG. 5 is an exploded perspective view of the capacitor body included in the feedthrough multilayer capacitor in accordance with the modified example.

In the feedthrough multilayer capacitor in accordance with the modified example, as shown in FIG. 4, the signal terminal electrode 1 covers the whole first side face L1a of the capacitor body L1 and a portion of the other surfaces (first and second main faces L1e, L1f and third and fourth side faces L1c, L1d) adjoining the first side face L1a. The signal terminal electrode 2 covers the whole second side face L1b of the capacitor body L1 and a portion of the other surfaces (first and second main faces L1e, L1f and third and fourth side faces L1c, L1d) adjoining the second side face L1b.

In this case, as shown in FIG. 5, the lead portions 21b to 24b, 21c to 24c connected to the signal terminal electrodes 1, 2 are formed with the same width as that of the main electrode portions 21a to 24a in the direction in which the third and fourth side faces L1c, L1d oppose each other.

Second Embodiment

Figure 6:
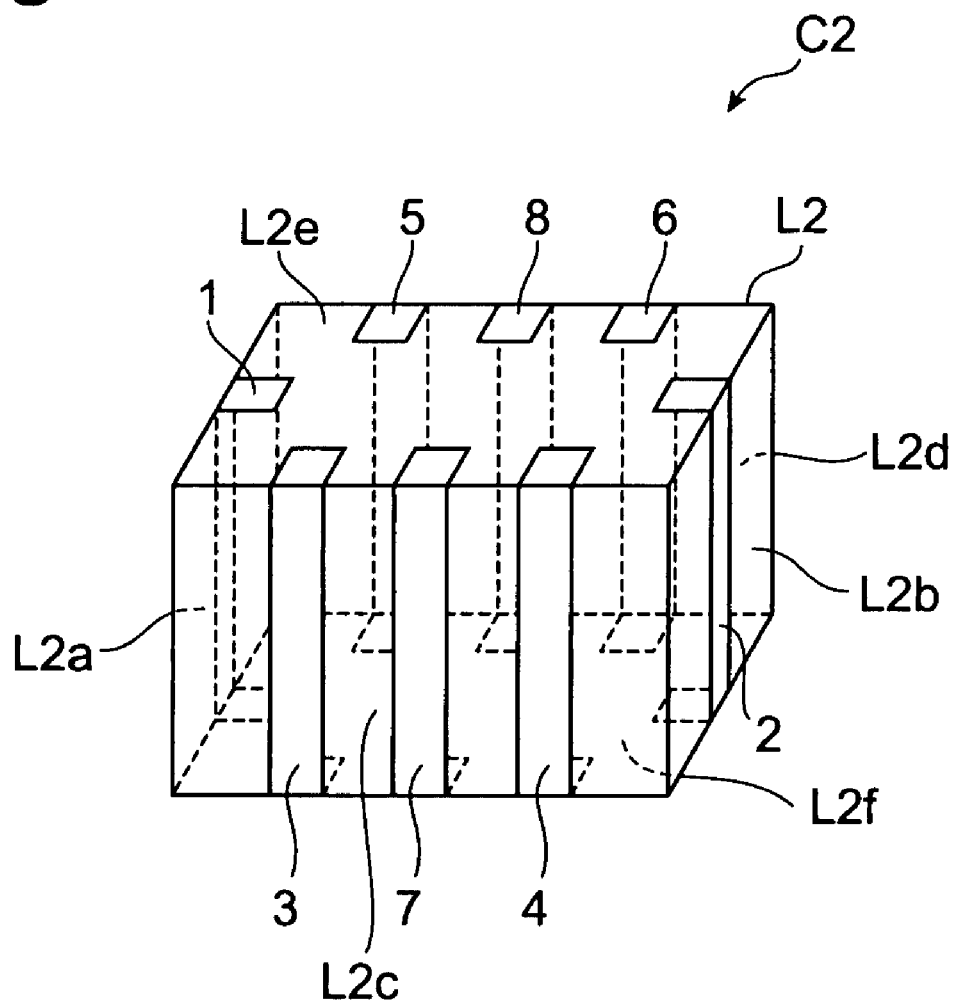
FIG. 6 is a perspective view of the feedthrough multilayer capacitor in accordance with a second embodiment.
Figure 7:
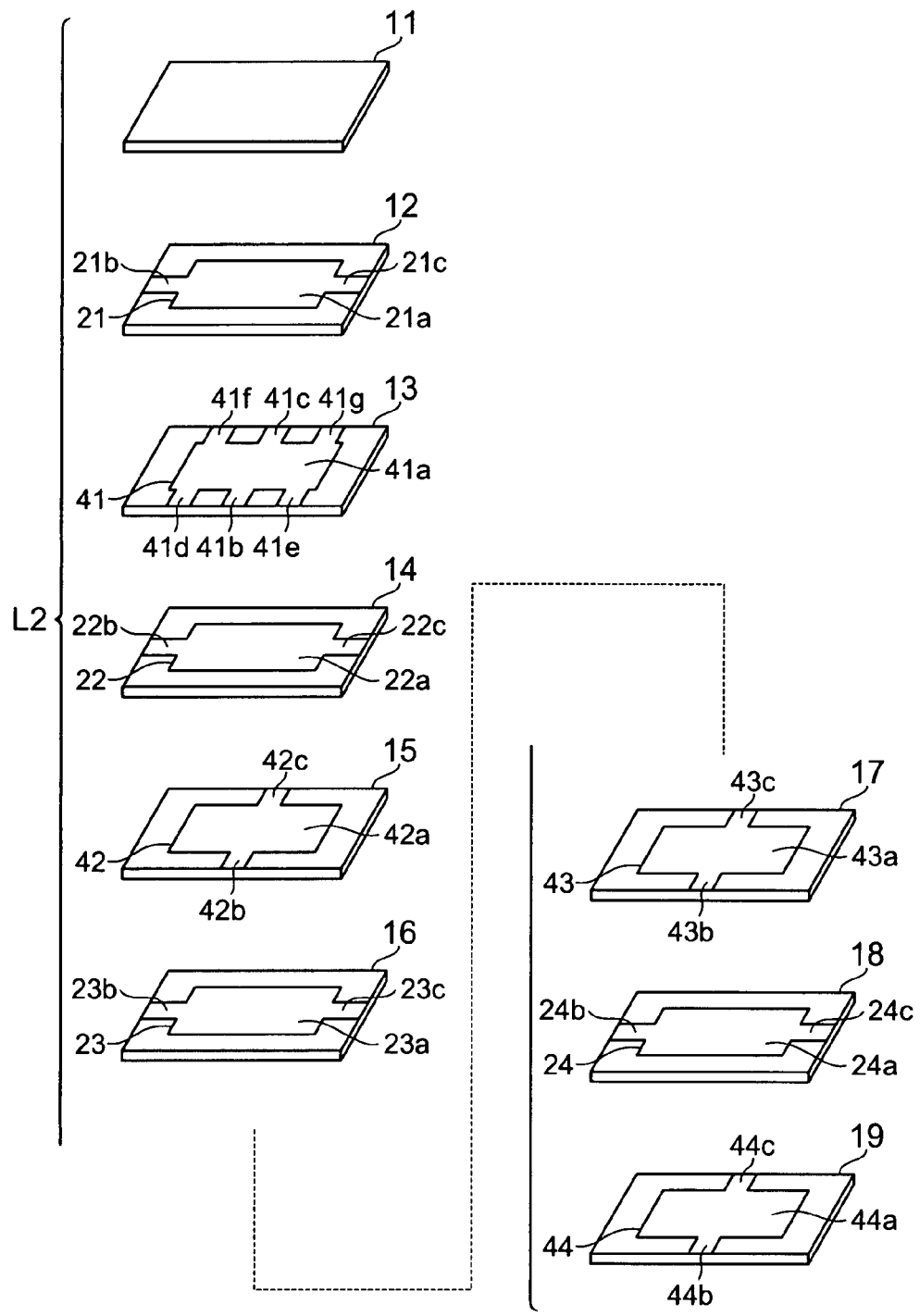
FIG. 7 is an exploded perspective view of the capacitor body included in the feedthrough multilayer capacitor in accordance with the second embodiment.

With reference to FIGS. 6 and 7, the structure of feedthrough multilayer capacitor C2 in accordance with a second embodiment will be explained. The feedthrough multilayer capacitor C2 in accordance with the second embodiment differs from the feedthrough multilayer capacitor C1 in accordance with the first embodiment in terms of the structure of grounding terminal electrodes and connecting conductors formed on the capacitor body. FIG. 6 is a perspective view of the feedthrough multilayer capacitor in accordance with the second embodiment. FIG. 7 is an exploded perspective view of the capacitor body included in the feedthrough multilayer capacitor in accordance with the second embodiment.

As shown in FIG. 6, the feedthrough multilayer capacitor C2 in accordance with the second embodiment comprises a capacitor body L2, signal terminal electrodes 1, 2 arranged on the outer surface of the capacitor body L2, grounding terminal electrodes 3 to 6 arranged on the outer surface of the capacitor body L2, and connecting conductors 7, 8 arranged on the outer surface of the capacitor body L2.

As shown in FIG. 6, the capacitor body L2 is shaped like a rectangular parallelepiped and has oblong first and second main faces L2e, L2f opposing each other, first and second side faces L2a, L2b extending in the shorter side direction of the first and second main faces L2e, L2f so as to connect the first and second main faces L2e, L2f to each other and opposing each other, and third and fourth side faces L2c, L2d extending in the longer side direction of the first and second main faces L2e, L2f so as to connect the first and second main faces L2e, L2f to each other and opposing each other.

The signal terminal electrode 1 is arranged on the first side face L2a of the capacitor body L2. The signal terminal electrode 2 is arranged on the second side face L2b. The signal terminal electrodes 1, 2 oppose each other in the direction in which the first side face L2a and second side face L2b oppose each other.

The grounding terminal electrodes 3, 4 and connecting conductor 7 are arranged on the third side face L2c. The grounding terminal electrodes 5, 6 and connecting conductor 8 are arranged on the fourth side face L2d.

The grounding terminal electrodes 3, 4 and connecting conductor 7 are arranged on the third side face L2c of the capacitor body L2 in the order of the grounding terminal electrode 3, connecting conductor 7, and grounding terminal electrode 4 in the direction from the first side face L2a to the second side face L2b. The grounding terminal electrodes 5, 6 and connecting conductor 8 are arranged on the fourth side face L2d in the order of the grounding terminal electrode 5, connecting conductor 8, and grounding terminal electrode 6 in the direction from the first side face L2a to the second side face L2b.

The grounding terminal electrodes 3, 5 oppose each other in the direction in which the third side face L2c and fourth side face L2d oppose each other. The grounding terminal electrodes 4, 6 oppose each other in the direction in which the third side face L2c and fourth side face L2d oppose each other. The connecting conductors 7, 8 oppose each other in the direction in which the third side face L2c and fourth side face L2d oppose each other.

As shown in FIG. 7, the capacitor body L2 has a plurality of (9 in this embodiment) insulator layers 11 to 19 and a plurality of (8 in this embodiment) inner electrodes 21 to 24, 41 to 44.

The plurality of inner electrodes 21 to 24, 41 to 44 include a plurality of (4 in this embodiment) signal inner electrodes 21 to 24, a plurality of (3 in this embodiment) first grounding inner electrodes 42 to 44, and a second grounding inner electrode 41.

The signal inner electrodes 22 to 24 and first grounding inner electrodes 42 to 44 are arranged so as to oppose each other with one of the insulator layers 14 to 18 in between each pair. The second grounding inner electrode 41 is arranged so as to oppose the signal inner electrode 21 with one insulator layer 12 in between, and oppose the signal inner electrode 22 with one insulator layer 13 in between.

The signal inner electrodes 21 to 24 include main electrode portions 21a to 24a, lead portions 21b to 24b extending from the main electrode portions 21a to 24a to the first side face L2a, and lead portions 21c to 24c extending from the main electrode portions 21a to 24a to the second side face L2b. The lead portions 21b to 24b are connected to the signal terminal electrode 1. The lead portions 21c to 24c are connected to the signal terminal electrode 2.

The first grounding inner electrodes 42 to 44 include rectangular main electrode portions 42a to 44a whose longer side direction is the longer side direction of the first and second main faces L2e, L2f of the capacitor body L2, lead portions 42b to 44b extending from the main electrode portions 42a to 44a to the third side face L2c, and lead portions 42c to 44c extending from the main electrode portions 42a to 44a to the fourth side face L2d.

The lead portions 42b to 44b extending so as to reach the third side face L2c of the capacitor body L2 are connected to the connecting conductor 7. The lead portions 42c to 44c extending so as to reach the fourth side face L2d of the capacitor body L2 are connected to the connecting conductor 8.

The second grounding inner electrode 41 includes a rectangular main electrode portion 41a whose longer side direction is the longer side direction of the first and second main faces L2e, L2f of the capacitor body L2, lead portions 41b, 41d, 41e extending from the main electrode portion 41a to the third side face L2c, and lead portions 41c, 41f, 41g extending from the main electrode portion 41a to the fourth side face L2d.

The lead portions 41b, 41d, 41e extending from the main electrode portion 41a to the third side face L2c are positioned in the order of the lead portions 41d, 41b, 41e in the direction from the first side face L2a to the second side face L2b. The lead portions 41c, 41f, 41g extending from the main electrode portion 41a to the fourth side face L2d are positioned in the order of the lead portions 41f, 41c, 41g in the direction from the first side face L2a to the second side face L2b.

The lead portion 41b extending so as to reach the third side face L2c of the capacitor body L2 is connected to the connecting conductor 7. The lead portion 41d extending so as to reach the third side face L2c of the capacitor body L2 is connected to the grounding terminal electrode 3. The lead portion 41e extending so as to reach the third side face L2c of the capacitor body L2 is connected to the grounding terminal electrode 4. The lead portion 41c extending so as to reach the fourth side face L2d of the capacitor body L2 is connected to the connecting conductor 8. The lead portion 41f extending so as to reach the fourth side face L2d of the capacitor body L2 is connected to the grounding terminal electrode 5. The lead portion 41g extending so as to reach the fourth side face L2d of the capacitor body L2 is connected to the grounding terminal electrode 6.

As the grounding inner electrodes, the feedthrough multilayer capacitor C2 has the first grounding inner electrodes 42 to 44 not connected to the grounding terminal electrodes 3 to 6, and the second grounding inner electrode 41 connected to the grounding terminal electrodes 3 to 6. When the grounding terminal electrode 3 is concerned, the respective resistance components of the connecting conductors 7, 8 are connected in series to the grounding terminal electrode 3. When the grounding terminal electrode 4 is concerned, the respective resistance components of the connecting conductors 7, 8 are connected in series to the grounding terminal electrode 4. When the grounding terminal electrode 5 is concerned, the respective resistance components of the connecting conductors 7, 8 are connected in series to the grounding terminal electrode 5. When the grounding terminal electrode 6 is concerned, the respective resistance components of the connecting conductors 7, 8 are connected in series to the grounding terminal electrode 6. These make the feedthrough multilayer capacitor C2 have an equivalent series resistance greater than that of the conventional feedthrough multilayer capacitor in which all the grounding inner electrodes 41 to 44 are connected to the grounding terminal electrodes 3 to 6 through lead portions. Also, a greater equivalent series resistance prevents impedance from dropping drastically at a resonance frequency, thus making it possible to increase the bandwidth.

As in the foregoing, this embodiment sets the equivalent series resistance of the feedthrough multilayer capacitor C2 to a desirable value by adjusting one or both of the number and position of the second grounding inner electrode 41 connected to the grounding terminal electrodes 3 to 6 through the lead portions 41c to 41g, whereby the equivalent series resistance can be regulated easily and accurately.

The feedthrough multilayer capacitor C2 also restrains the equivalent series resistance from becoming small, even when the capacitance is enhanced by increasing the number of laminated signal inner electrodes and first grounding inner electrodes so as to respond to greater capacity.

When the feedthrough multilayer capacitor C2 is connected to a circuit board or the like such as to yield the equivalent circuit shown in FIG. 3, the capacitance and the resistance obtained by connecting the grounding inner electrodes 41 to 44 through the connecting conductors 7, 8 are connected in series. Therefore, this feedthrough multilayer capacitor C2 is favorable as a capacitor for a power supply.

In the feedthrough multilayer capacitor C2, the signal terminal electrodes 1, 2 oppose each other in the direction in which the first and second side faces L2a, L2b of the capacitor body L2 oppose each other. The pairs of grounding terminal electrodes 3, 5, grounding terminal electrodes 4, 6, and connecting conductors 7, 8 oppose each other in the direction in which the first and second side faces L2a, L2b of the capacitor body L2 oppose each other. These make it easy to connect the signal terminal electrodes 1, 2 to a linear signal lead, the grounding terminal electrodes 3, 5 to a linear ground connecting lead, and the grounding terminal electrodes 4, 6 to a linear ground connecting lead, for example, in the feedthrough multilayer capacitor C2, whereby its mounting is easy.

Though preferred embodiments of the present invention are explained in detail in the foregoing, the present invention is not limited to the above-mentioned embodiments and modified example. For example, the number of signal terminal electrodes connected to the signal inner electrodes 21 to 24 may be 3 or more without being restricted to the numbers stated in the above-mentioned embodiments and modified example. The number of grounding terminal electrodes connected to the second grounding inner electrode 41 may be 1, 3, or 5 or more, for example, without being restricted to the numbers stated in the above-mentioned embodiments and modified example. The number of connecting conductors may be 1, 3, or 5 or more, for example, without being restricted to the numbers stated in the above-mentioned embodiments and modified example.

The arrangements of the signal terminal electrodes 1, 2, grounding terminal electrodes 3 to 6, and connecting conductors 7 to 10 are not limited to those stated in the above-mentioned embodiments and modified example as long as they are arranged on the outer surface of the capacitor body. Therefore, for example, it is not necessary for the signal terminal electrodes to oppose each other in the direction in which the first and second side faces of the capacitor body oppose each other. For example, it is not necessary for the grounding terminal electrodes to oppose each other in the direction in which the third and fourth side faces of the capacitor body oppose each other. For example, it is not necessary for the connecting conductors to oppose each other in the direction in which the third and fourth side faces of the capacitor body oppose each other.

The number of laminated insulator layers 11 to 19 and the number of laminated inner electrodes 21 to 24, 41 to 44 are not limited to those stated in the above-mentioned embodiments and modified example. The forms of the inner electrodes 21 to 24, 41 to 44 are not limited to those stated in the above-mentioned embodiments and modified example.

The number and position in the laminating direction of the second grounding inner electrode 41 connected to the grounding terminal electrodes through lead portions are not limited to those stated in the above-mentioned embodiments and modified example. The second grounding inner electrode may be arranged so as to oppose the first grounding inner electrode with an insulator layer in between, instead of opposing the signal inner electrode with an insulator layer in between.

The number of insulator layers held between the signal inner electrode and the first grounding inner electrode may be 2 or more, for example, without being restricted to those stated in the above-mentioned embodiments and modified example as long as it is at least 1. The number of insulator layers held between the second grounding inner electrode and the signal inner electrode may be 2 or more, for example, without being restricted to those stated in the above-mentioned embodiments and modified example as long as it is at least 1.

Insulator layers may be laminated further on the capacitor body of the multilayer capacitor in accordance with the present invention or alternately with the inner electrodes.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A feedthrough multilayer capacitor comprising:
   a capacitor body;
   at least two signal terminal electrodes arranged on an outer surface of the capacitor body;
   at least one grounding terminal electrode arranged on the outer surface of the capacitor body; and
   at least one connecting conductor arranged on the outer surface of the capacitor body; wherein
   the capacitor body includes a plurality of insulator layers laminated, a signal inner electrode and a first grounding inner electrode arranged so as to oppose each other with at least one of the plurality of insulator layers in between, and a second grounding inner electrode arranged so as to oppose the signal inner electrode or first grounding inner electrode with at least one of the plurality of insulator layers in between;
   the signal inner electrode is connected to the at least two signal terminal electrodes;
   the first grounding inner electrode is directly connected to only the at least one connecting conductor; and
   the second grounding inner electrode is directly connected to the at least one grounding terminal electrode and the at least one connecting conductor.

2. The feedthrough multilayer capacitor according to claim 1, wherein
   the capacitor body is formed like a rectangular parallelepiped and has oblong first and second main faces opposing each other, first and second side faces extending in a shorter side direction of the first and second main faces so as to connect the first and second main faces to each other and opposing each other, and third and fourth side faces extending in a longer side direction of the first and second main faces so as to connect the first and second main faces to each other and opposing each other;
   the at least two signal terminal electrodes are arranged on the first and second side faces, respectively;
   the at least one grounding terminal electrode is arranged on the third or fourth side face;
   the at least one connecting conductor is arranged on the third or fourth side face;
   the signal inner electrode includes a main electrode portion whose longer side direction is the longer side direction of the first and second main faces, and lead portions respectively extending from the main electrode portion to the first and second side faces and connecting with the signal terminal electrodes;
   the first grounding inner electrode includes a main electrode portion whose longer side direction is the longer side direction of the first and second main faces, and a lead portion extending from the main electrode portion to the third or fourth side face and connecting with the connecting conductor; and
   the second grounding inner electrode includes a main electrode portion whose longer side direction is the longer side direction of the first and second main faces, a lead portion extending from the main electrode portion to the third or fourth side face and connecting with the connecting conductor, and a lead portion extending from the main electrode portion to the third or fourth side face and connecting with the grounding terminal electrode.

3. The feedthrough multilayer capacitor according to claim 1, wherein the first grounding inner electrode is electrically connected to the at least one grounding terminal electrode only through the second grounding inner electrode and the at least one connecting conductor.

* * * * *